(12) United States Patent  (10) Patent No.: US 8,157,209 B2
Dittmar et al.  (45) Date of Patent: Apr. 17, 2012

(54) METHOD FOR ISOLATING A CABIN WALL OF AN AIRCRAFT OR FOR COOLING OR HEATING OF CABIN AIR AND A CABIN WALL SUITABLE THEREFORE

(75) Inventors: Jan Dittmar, Buxtehude (DE); Marc Hoelling, Hamburg (DE); Rainer Mueller, Rosengarten (DE)

(73) Assignee: Airbus Operations GmbH (DE)

( * ) Notice: Subject to any disclaimer, the term of this patent is extended or adjusted under 35 U.S.C. 154(b) by 589 days.

(21) Appl. No.: 12/317,251

(22) Filed: Dec. 19, 2008

(65) Prior Publication Data

US 2009/0189018 A1  Jul. 30, 2009

Related U.S. Application Data

(60) Provisional application No. 61/008,790, filed on Dec. 21, 2007.

(51) Int. Cl.
*B64C 1/00* (2006.01)

(52) U.S. Cl. .................................................. 244/117 R
(58) Field of Classification Search ............. 244/117 A, 244/121, 119, 126
See application file for complete search history.

(56) References Cited

U.S. PATENT DOCUMENTS 3,867,244 A  2/1975  Adams

FOREIGN PATENT DOCUMENTS

| WO | 00/37313 | 6/2000 |
| WO | 2008101986 | 8/2008 |

*Primary Examiner* — Milton Nelson, Jr.
(74) *Attorney, Agent, or Firm* — Lerner, David, Littenberg, Krumholz & Mentlik, LLP

(57) ABSTRACT

The present invention relates to a method for insulating an aircraft cabin 6 and for the cooling or heating of cabin air in an aircraft, respectively with the method comprising the steps of: introducing aircraft cabin air into an aircraft cabin wall 6; guiding this aircraft cabin air along a section of this aircraft cabin wall 6; and leading this aircraft cabin air away from the aircraft cabin wall 6.

6 Claims, 2 Drawing Sheets

METHOD FOR ISOLATING A CABIN WALL OF AN AIRCRAFT OR FOR COOLING OR HEATING OF CABIN AIR AND A CABIN WALL SUITABLE THEREFORE

CROSS REFERENCE TO RELATED APPLICATION

This application claims the benefit of the filing date of U.S. Provisional Patent Application No. 61/008,790 filed Dec. 21, 2007, the disclosure of which applications is hereby incorporated herein by reference.

BACKGROUND OF THE INVENTION

The present invention relates to a method for the cooling or heating of aircraft cabin air, or to an aircraft cabin wall comprising an outer skin and a sidewall panel that is suitable for this method.

SUMMARY OF THE INVENTION

An aircraft cabin wall usually comprises an outer skin and a sidewall panel. In this arrangement the sidewall panel is the inner delimitation to the cabin interior. The cabin interior must be insulated by the aircraft cabin wall, in particular against cooling. In this arrangement, insulation is achieved in that insulating material is affixed between the outer skin and the sidewall panel. Usually, primary insulation is arranged on the outer skin, while a second insulation, the secondary insulation, is arranged on the sidewall panel. In this arrangement the two insulations, namely the primary insulation and the secondary insulation, are arranged in the space between the outer skin and the sidewall panel. Insulation must ensure a predetermined minimum surface temperature of the sidewall panel. This is achieved by a corresponding thickness of the primary insulation and of the secondary insulation. Since the insulation of the aircraft cabin wall needs to be designed for the worst case, i.e. for the largest possible assumed temperature gradient between the outer skin and the sidewall panel, the thicknesses of the insulations must be designed correspondingly.

The temperature of the air in the aircraft cabin, the aircraft cabin air, should be within a range that is convenient to passengers. Passengers themselves contribute to the heating of the cabin air over time. For this reason cooling of the cabin air is required in order to ensure constant travel comfort. Cooling of the aircraft cabin air normally takes place with the use of cold fresh air. The cold fresh air is mixed, in a mixing chamber, with the already present aircraft cabin air, as a result of which mixing the temperature of the mixture is reduced compared to that of the original aircraft cabin air and kept constant over time respectively. The mixing chamber and its inlet and outlet lines result in an increase in weight and furthermore take up considerable space within the aircraft.

It is an object of the invention to provide a method and a device for more economical and lighter-weight insulation of an aircraft cabin and for the cooling or heating of aircraft cabin air.

This object is met by a method for insulating an aircraft cabin, respectively for the cooling or heating of aircraft cabin air, by an aircraft cabin wall that is suitable for this, by a corresponding aircraft, and the use of an aircraft cabin wall that is suitable for this, according to the independent claims.

Further advantageous embodiments of the invention are stated in the dependent claims.

The method according to the invention for insulating an aircraft cabin or for the cooling or heating of aircraft cabin air comprises the steps of: introducing the aircraft cabin air into an aircraft cabin wall; guiding this aircraft cabin air along a section of this aircraft cabin wall; and leading this aircraft cabin air out of the aircraft cabin wall. After the aircraft cabin air has passed through the gap, it is again fed to the air conditioning system of the aircraft. The aircraft cabin wall according to the invention comprises an outer skin and a sidewall panel and is designed to accomplish the method according to the invention.

In flight, outside the aircraft the temperatures are usually very low, which temperatures must be insulated against the aircraft interior in which the passengers are accommodated. On the other hand as a result of the body heat of passengers the aircraft cabin air is heated up over time and needs to be cooled. The method according to the invention causes a heat exchange. To this effect, aircraft cabin air is introduced into the aircraft cabin wall and then flows along the aircraft cabin wall. This results in a heat exchange because the aircraft cabin wall is heated and the aircraft cabin air is cooled. The cooled aircraft cabin air is then led out of the aircraft cabin wall again and can be transported back into the passenger compartment.

This active insulation of an aircraft cabin results in that the dimensioning of the insulation requires a smaller installed volume. In this way it is either possible to reduce the external diameter of the aircraft fuselage and thus the aircraft's drag in flight. Or it is possible to enlarge the aircraft cabin interior, as a result of which passenger comfort is enhanced, and more passengers can be accommodated respectively.

In order to cool the aircraft cabin air the aircraft cabin air is mixed with fresh air in a mixing chamber. As a result of cooling, according to the invention, of the aircraft cabin air, the temperature of the fresh air can be selected so as to be higher so that the energy requirement for conditioning the fresh air can be reduced, which results in lower operating costs.

From the point of view of thermodynamics, large exergy losses arise during mixing of airstreams with large temperature differentials. Furthermore, the arising exergy losses are small if the temperature differentials of the airstreams are small. As a result of the cooling, according to the invention, of the aircraft cabin air, the temperature difference between fresh air and aircraft cabin air is reduced. Therefore, advantageously, less exergy losses result during further cooling of the aircraft cabin air as a result of mixing with fresh air.

In the same manner as described above, heating of the aircraft cabin air can be achieved, e.g. while the aircraft is on the ground. In this case it may be necessary to heat the passenger compartment and to cool the aircraft cabin wall.

Advantageously, the aircraft cabin wall comprises insulation between the outer skin and the sidewall panel, which insulation usually comprises a material of low thermal conductivity.

Particularly advantageous is the arrangement of a layer of insulation on the outer skin and of a further layer of insulation on the sidewall panel, wherein between the two layers of insulation a region remains along which the aircraft cabin air can flow.

It is particularly advantageous if between these two layers of insulation the spacing remains the same, so that turbulences of the flowing aircraft cabin air can be avoided.

An embodiment according to the invention provides for an aircraft with an aircraft cabin wall according to the invention. In this arrangement it is particularly advantageous if the aircraft according to the invention comprises a device for draining off water.

The aircraft cabin air is cooled within the aircraft cabin wall, as a result of which water can condense. Over time this water can accumulate in the aircraft cabin wall and can result in an increase of weight of the aircraft and in a reduction of insulation effect. The drained condensation water can either be collected and removed from the aircraft in a targeted manner, or it can be used again for enriching aircraft cabin air in order to increase the humidity of the air within the aircraft cabin, thus ensuring thermal comfort. The drainage system thus prevents the above-described increase of weight of the aircraft. Furthermore, as a result of the removal of the condensation water the insulation function of the aircraft cabin wall is ensured even over an extended service life, and corrosion damages are prevented.

BRIEF DESCRIPTION OF THE DRAWINGS

Below, for further explanation and to provide a better understanding of the present invention exemplary embodiments are explained in more detail with reference to the enclosed drawings. In the following.

DETAILED DESCRIPTION

Figure 1:
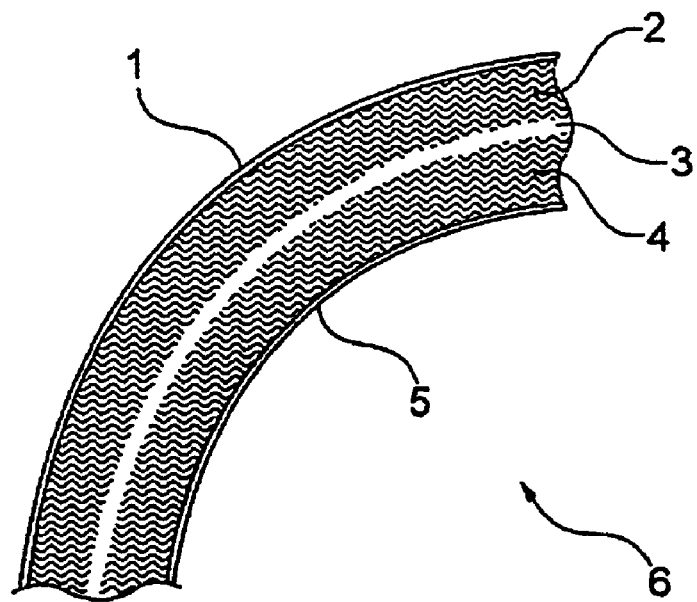
FIG. 1 shows part of a diagrammatic cross-sectional view of an aircraft cabin wall according to the state of the art.

In the following drawings the same reference characters are used for identical or similar elements.

FIG. 1 shows a diagrammatic cross-section of a part of an aircraft cabin wall according to the state of the art. In this arrangement, the aircraft cabin wall 6 comprises an outer skin 1 and a sidewall panel 5. In this arrangement the insulation is provided by two materials 2 and 4 that have been applied, wherein material 2 is arranged on the outer skin 1, and material 4 is arranged on the sidewall panel 5. In this arrangement the materials 2 and 4 have low thermal conductivity. The arrangement of the insulating materials 2 and 4 can result in a gap 3. This gap varies as a result of production-related factors, or it can be absent altogether. The insulating materials 2 and 4 have to be designed such that they ensure a correspondingly good insulation between the interior region of the aircraft and the exterior region even in the worst case, in other words under the worst conditions to be assumed. This requires correspondingly large thicknesses of the insulating materials 2 and 4.

Figure 2:
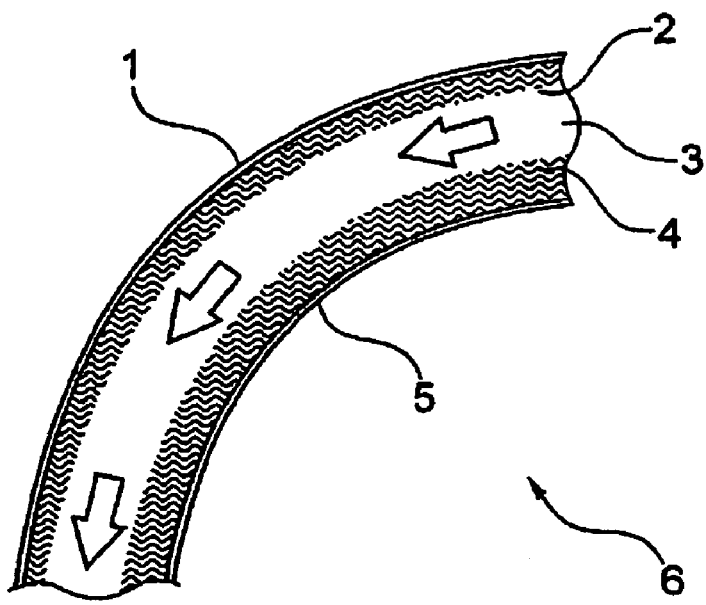
FIG. 2 shows a diagrammatic cross-sectional view of a part of an aircraft cabin wall according to the invention.

FIG. 2 shows the aircraft cabin wall according to the invention. It also comprises an outer skin 1 and a sidewall panel 5 on which insulating materials 2 and 4 are arranged. In this design the insulating material 2 is arranged on the outer skin 1, while the insulating material 4 is arranged on the sidewall panel 5. According to the invention, the insulating materials 2 and 4 are arranged such that a gap 3, which is approximately uniform in width, is formed between the insulating materials 2 and 4. In this arrangement the two insulating materials 2 and 4 can also be left out completely, and a gap can be formed directly between the outer skin and the aircraft cabin wall. Aircraft cabin air can be conveyed through this gap 3. Said aircraft cabin air is, for example, fed in at an upper region of the aircraft cabin wall 6 and cools down as it flows through the aircraft cabin wall 6. The cooled aircraft cabin air is removed from the aircraft cabin wall 6 in a lower region of the aircraft cabin wall 6. In this process heat exchange between the aircraft cabin air and the aircraft cabin wall 6 takes place.

The degree of heat exchange between the aircraft cabin air and the aircraft cabin wall can be controlled by the quantity of aircraft cabin air that is fed in. In this arrangement, in the case of lower temperatures in the exterior of the aircraft, more aircraft cabin air can be fed through the aircraft cabin wall 6. As a result of this active control the aircraft cabin wall can be designed so as to be thinner.

After the heat exchange the cooled aircraft cabin air can either be returned to the aircraft cabin region, or said cooled aircraft cabin air can be still further cooled with fresh air in a mixing chamber so that the desired interior temperature in the aircraft is attained. Because of the cooling action that has already taken place, lower exergy losses during mixing result.

When cooling the aircraft cabin air in the aircraft cabin wall 6, condensation water may form. This condensation water can be drained from the aircraft cabin wall 6 by the arrangement of a drainage system in the aircraft. The condensation water can then be used for humidifying the air that is introduced into the aircraft cabin interior in order to increase the air humidity within the aircraft cabin and thus enhance thermal comfort.

Figure 3:
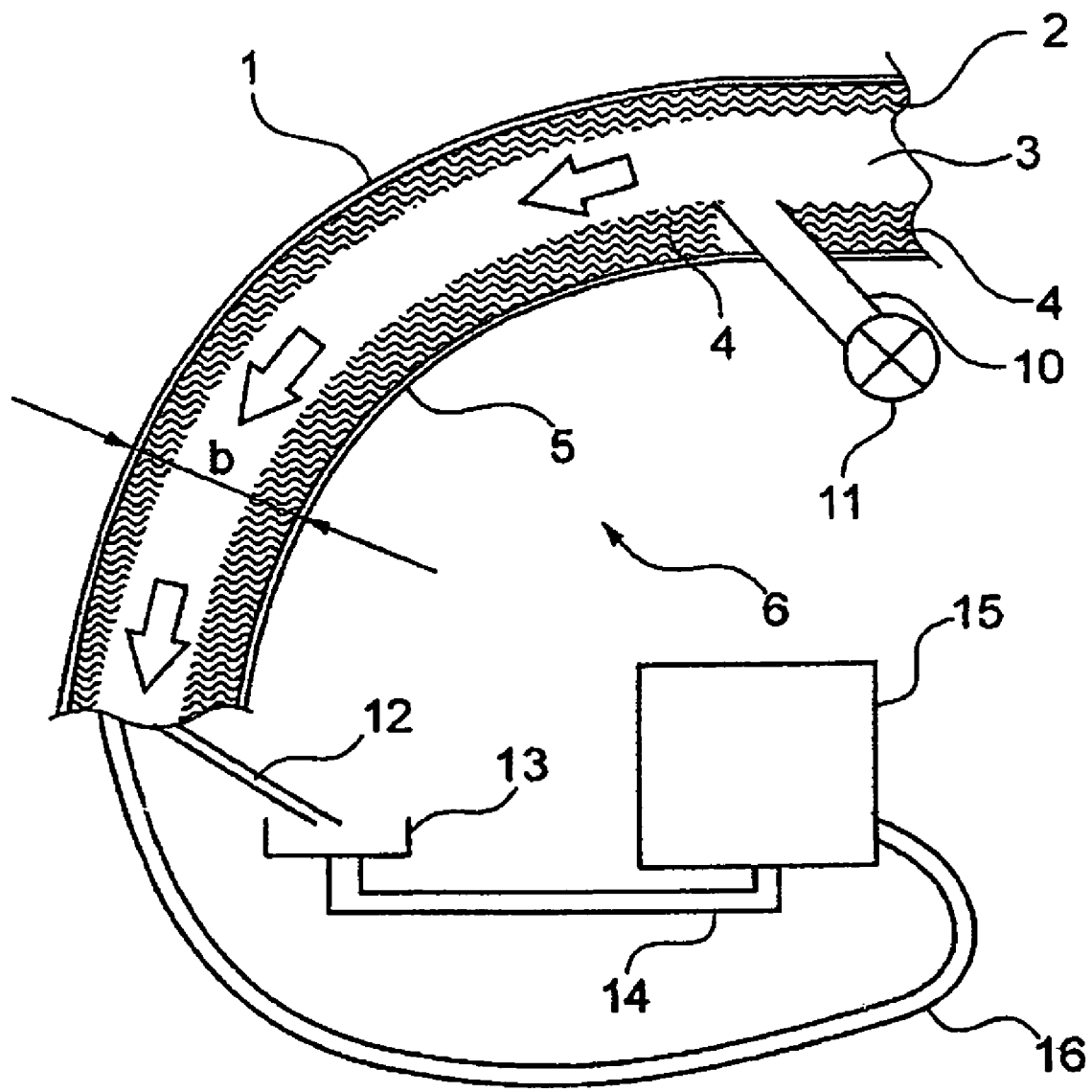
FIG. 3 shows a further diagrammatic cross-sectional view of a part of an aircraft cabin wall according to an exemplary embodiment of the invention.

FIG. 3 shows a further diagrammatic cross-sectional view of a part of an aircraft cabin wall according to an exemplary embodiment of the present invention. As shown in FIG. 3, in the sidewall panel 5 and in the secondary insulation 4 an opening is provided into which an air line, for example a pipe 10, has been inserted. This pipe 10 is connected to a fan 11 so that, by means of activation of the fan 11, air can be blown into the gap in a targeted manner and, for example, as indicated by the arrows in FIG. 3, a controlled circulation and a controlled flow of the aircraft cabin interior air in the gap can be generated. Furthermore, in this arrangement fan control can be provided that is linked to the air conditioning system 15 so that a cooperating system for air circulation can be generated so that, in coordination to the quantity of heat or the quantity of cool air required at any point in time by the air conditioning system, the correct quantity of air flowing in the gap can be set. The air cooled in the gap 3 can be conveyed to the air conditioning system 15 by a connection 16, wherein said air conditioning system 15, as described above, can be set in an optimized manner, by controlling the fan 11 in the sense of a closed-loop, optimized in respect of temperature conditions, for example when standing on a hot runway prior to takeoff, or when flying at high altitude or during extended cruising at high altitude, where the temperature input by the passengers accommodated in the cabin is not inconsiderable.

At a suitable position in the aircraft fuselage or in the aircraft cabin wall, for example in a lower region (in a bilge region), drainage 12 can be provided in order to drain away in a targeted manner any condensation water that may have formed in the gap 3. This condensation water can be collected in a collection container 13 and can be conveyed to the air conditioning system 15 by a pipe connection 14. This drained condensation water can be used in the air conditioning system 15 for the targeted rehumidification of the cabin air.

In order to simplify the outflow of condensation air from the primary insulation 2 or from the secondary insulation 4, the surfaces of these two layers of insulation, which surfaces face the gap, can, for example, comprise a water-repellent material or a thin plastic coating so that any condensation water that might form can be fed more quickly and in a more targeted manner to the drainage container 13. Likewise, such a coating can prevent any possible condensation water infiltration into the insulation layer, for example into the insulation foam, itself.

The aircraft cabin wall shown in FIGS. 2 and 3 can either be along the entire length of the cabin of an aircraft, or it can be provided only in certain sections or segments of the aircraft fuselage. Preferably, for example, a large gap width can be achieved without any problems in regions where it is precisely not the entire width of the aircraft outer skin 1 that needs to be utilized in order to accommodate as many passengers as possible beside each other. This is, for example, imaginable in more generously designed regions of a first class cabin or business class cabin of a passenger aircraft.

In contrast to conventional aircraft cabin insulation arrangements the above exemplary embodiments comprise an enlarged and defined gap through which, as is for example shown in FIG. 3, already spent aircraft cabin air actively flows. In this context the term "defined gap" refers to a gap whose height (h) and width (b) respectively is as uniform as possible, of which gap in addition all the other geometric dimensions are known so that optimum circulation or an unhindered airflow can be achieved.

In order to be able to achieve an improved insulation effect, a multitude of fans or flow control means, for example air fins or flow grills, can be provided in order to design the flow in the gap so that it is as homogeneous as possible.

The design comprising an actively ventilated air gap makes it possible to minimize the thickness of the primary insulation layer and of the secondary insulation layer. The throughflow of warm cabin air results in energy input into the insulation layer, and the surface temperature of the sidewall panel can be kept above a determined minimum temperature even in the case of reduced thicknesses of the insulation layers.

Apart from the actual function of the insulation effect, the new insulation concept is associated with an advantage in that in flight the airstream that flows into the gap is cooled. In other words, the air that enters the mixing chamber of the air conditioning system is at a lower temperature. At a defined air temperature at the point of entry into the cabin this means that the temperature of the air flowing out of the air conditioning system (temperature of the fresh air entering the mixing chamber) can be higher, which results in reduced energy requirements of the air conditioning system, and is reflected directly in reduced energy consumption of the aircraft.

From a thermodynamic point of view this is advantageous because the mixing of air streams with great temperature differentials can be associated with very considerable losses of energy.

Since the temperatures in the gap can at times drop to very low levels, in the insulation shown above, i.e. in the above exemplary embodiments of aircraft walls, condensation can occur at times. However, as is shown, for example, in FIG. 3, this can be controlled by drainage devices, where the condensation water does not remain in the insulating material (an effect which, as indicated above, could also be achieved by coating the insulating material), but the condensation water that arises can then be drained in a targeted manner. The collected condensation water can be fed to the cabin air in order to increase the humidity of the air within the aircraft cabin, thus enhancing the thermal comfort of the passengers.

In summary, a cabin wall system according to the above exemplary embodiments requires less space as a result of an equally good insulation effect despite a relatively large gap. The cooling and dehumidification of the cabin air can be controlled in a simple manner, and an uncontrolled condensation and water collection in the region of the insulation is prevented. Furthermore, reduced temperature differences between fresh air and recirculated cabin air in the mixing chamber can be achieved, which results in a minimization of energy losses.

In summary, in the present invention at least part of the aircraft cabin air is fed into a defined gap in the aircraft cabin wall. This can be achieved actively, for example by means of a fan.

By means of active ventilation, the air in the gap can, for example, also be introduced at pressure.

By providing air guidance fins or similar devices in combination with the fans, a homogeneous airstream is obtained. The aircraft cabin air is channeled, in the gap, along a section of this aircraft cabin wall. The aircraft cabin air is then led out of the aircraft cabin wall and can then be again conveyed to an air conditioning system of the aircraft.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft cabin wall comprising an outer skin and a sidewall panel, wherein between the outer skin and the sidewall panel a defined air gap is provided for a controlled through-conveyance of aircraft cabin air; wherein on the inside of the outer skin a layer of primary insulation is provided; wherein on a side of the sidewall panel which side faces the outer skin a layer of secondary insulation is provided; and wherein the defined gap is formed between the primary insulation and the secondary insulation; and wherein a ventilation device is provided for an active ventilation of the aircraft cabin through the gap.

2. The aircraft cabin wall of claim 1, wherein the gap comprises a width (b) that is essentially uniform.

3. An aircraft comprising an aircraft cabin wall of claim 1.

4. The aircraft cabin wall of claim 1, wherein the defined gap comprises a drainage device for draining condensation water that forms in the gap and/or on the secondary insulation and/or on the primary insulation.

5. The aircraft cabin wall of claim 4, wherein a collection device for a collection of condensation water is provided, wherein the collection device is optionally connectable to an air conditioning system of the aircraft, for re-supplying the condensation water to the cabin interior air.

6. An aircraft comprising an aircraft cabin wall of claim 5, wherein the collection device is connected to the air conditioning system by a line.

\* \* \* \* \*